United States Patent
Frances et al.

(10) Patent No.: US 6,355,222 B2
(45) Date of Patent: *Mar. 12, 2002

(54) MANUFACTURE OF HYDROGEN BROMIDE GAS

(75) Inventors: Sylvie Frances, Champ-sur-Drac; Gilles Drivon, Saint-Martin-en-Haut; Philippe Leduc, Saint Sorlin, all of (FR)

(73) Assignee: Elf Atochem S.A., Puteaux (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/210,372

(22) Filed: Dec. 14, 1998

(30) Foreign Application Priority Data

Dec. 12, 1997 (FR) .............................. 97/15765

(51) Int. Cl.[7] .............................................. C01B 7/09
(52) U.S. Cl. ...................................... 423/487; 423/486
(58) Field of Search ................................ 423/486, 487, 423/481

(56) References Cited

U.S. PATENT DOCUMENTS

| | | | | | |
|---|---|---|---|---|---|
| 1,380,084 A | * | 5/1921 | Tschudi | ...................... | 423/487 |
| 1,905,432 A | * | 4/1933 | Bauer | ......................... | 423/487 |
| 2,070,263 A | | 2/1937 | Dressel et al. | .............. | 423/487 |
| 2,366,670 A | * | 2/1945 | Maude | ........................ | 423/487 |
| 3,119,669 A | * | 1/1964 | Laid, Jr. et al. | ............ | 423/487 |
| 3,925,540 A | * | 12/1975 | Hatherly | ..................... | 423/478 |
| 3,988,427 A | * | 10/1976 | Bosssler, III et al. | ....... | 423/487 |
| 3,998,926 A | * | 12/1976 | Oliver et al. | ................. | 423/22 |
| 4,960,378 A | | 10/1990 | Jannemann et al. | ........ | 431/114 |
| 5,685,169 A | | 11/1997 | Nagamura et al. | ........... | 62/617 |
| 6,036,936 A | * | 3/2000 | Daire et al. | ................. | 423/487 |

FOREIGN PATENT DOCUMENTS

| | | | | | |
|---|---|---|---|---|---|
| DE | 428225 | * | 4/1926 | ................. | 423/487 |
| DE | 2738744 | * | 3/1979 | ................. | 423/487 |
| EP | 497 712 | * | 8/1992 | ................. | 423/487 |
| GB | 173300 | * | 1/1921 | ................. | 423/487 |
| JP | 6032601 | * | 2/1991 | ................. | 423/487 |
| WO | WO96/08442 | | 3/1996 | | |

OTHER PUBLICATIONS

FR 2750412—English Abstract.
FR 2365516—English Abstract.
Translation for DE 428,225, Apr. 1926.*
Translation for DE 2,738,744, Mar. 1979.*

* cited by examiner

*Primary Examiner*—Ngoc-Yen Nguyen
(74) *Attorney, Agent, or Firm*—Millen, White, Zelano & Branigan, P.C.

(57) ABSTRACT

A process for the production of hydrogen bromide gas by direct combustion of bromine in hydrogen involves carrying out the combustion reaction in an apparatus chamber made of impregnated graphite, a chamber outlet composed of a cylindrical segment disposed between a converging segment and a diverging segment, and a cooling zone composed of a steel jacket in which are piled block of impregnated graphite.

11 Claims, 3 Drawing Sheets

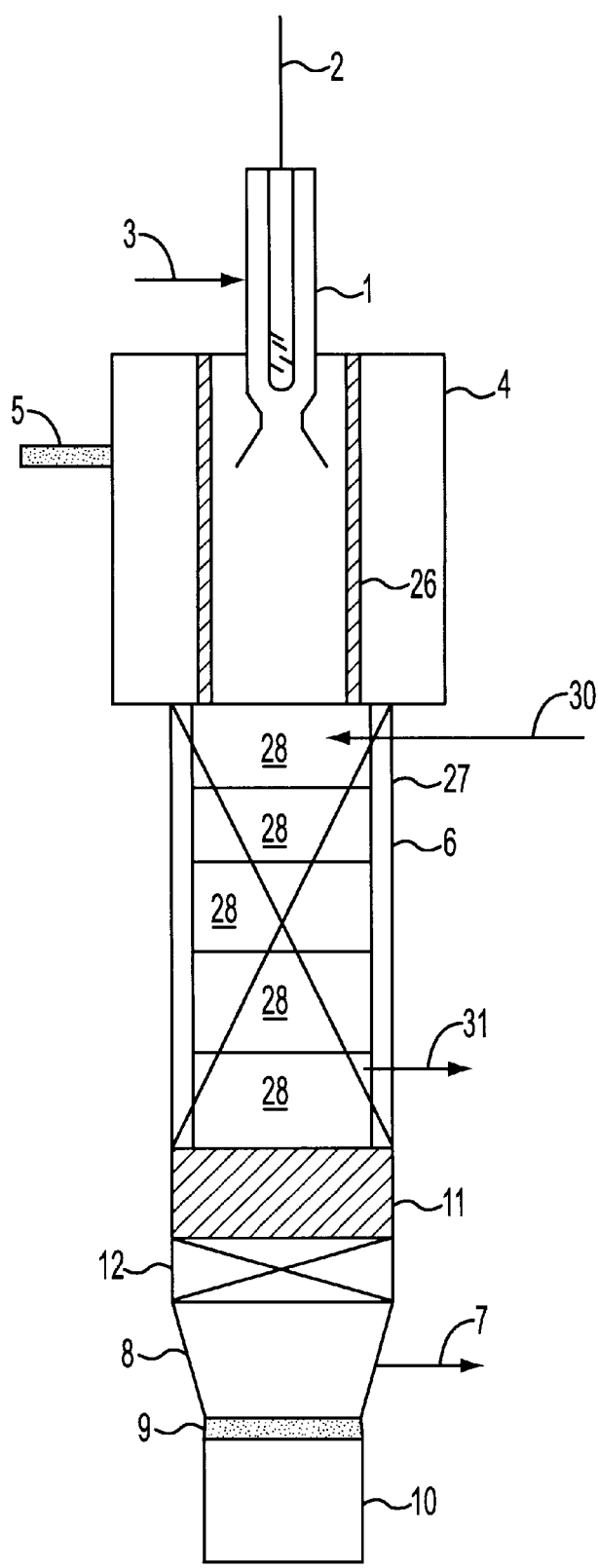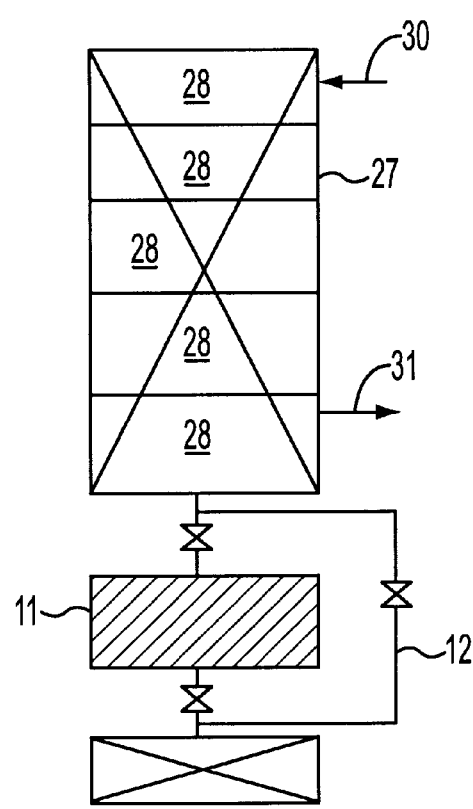
FIG. 3A
FIG. 3B

MANUFACTURE OF HYDROGEN BROMIDE GAS

FIELD OF THE INVENTION

The invention relates to a device for the manufacture of hydrogen bromide by direct combustion of bromine in hydrogen.

BACKGROUND OF THE INVENTION

U.S. Pat. No. 2,070,263 describes a method for obtaining aqueous solutions of hydrobromic acid which consists, in a first step, in passing hydrogen through liquid bromine maintained at a temperature of between 37° C. an° 42° C. in order to form a mixture of bromine and hydrogen gas which is burnt at a temperature of between 600° C. and 850° C. By working in this way, it is difficult to have an intimate mixture of bromine and hydrogen in stoichiometric amounts on account of the difficulties in rigorously maintaining the temperatures and the thermodynamic equilibria.

An instability of the combustion flame has also been observed, in devices based on the direct combustion of bromine in hydrogen according to an $H_2/Br_2$ molar ratio of greater than 1, and for which no technique for mixing the reactants is mentioned, this instability being manifested in particular by strong vacillation of the flame at the burner outlet, going as far as a detachment of the flame ("blow off") from the said burner, which may entail a risk of explosion, a fluctuating quality of the hydrogen bromide gas produced and a risk of the flame returning.

Furthermore, such flames become extended forming cones at the base of which are regions from which the reactants are liable to escape without being burnt.

This disrupts the combustion of the bromine in the hydrogen and results especially in residual bromine in the combustion gases, this being of a nature to bring about a considerable decrease in the lifetime of the burners, limit the range of materials which may be used and degrade the quality of the hydrogen bromide gas, thereby preventing it from being used as a reactant for downstream syntheses (secondary reactions, colorations of the products) or for the preparation of pure hydrobromic acid solutions.

Patent FR 2,365,516 proposes a process which improves the stability of the flame resulting from the combustion of bromine in hydrogen by establishing a helical stream of bromine in a cylindrical chamber, then injecting the hydrogen radially towards the outside in the helical stream of bromine and continuously supplying a flame close to the chamber with the helical stream of bromine and hydrogen.

This process, using a molar excess of hydrogen of 2.6%, leads to an HBr gas containing 300 ppm of bromine by volume, which still gives rise to colorations of the downstream synthesis products as well as the drawbacks mentioned above.

In addition, the complexity of the burner entails a lack of flexibility. Thus, in particular, when it is desired to increase the capacity of said device, several burners are arranged side by side in the same chamber. In such an arrangement, it cannot be avoided that the flame from different burners mounted in parallel will interfere with each other, and furthermore this arrangement is unacceptable with regard to obtaining good distribution of the reactants. This configuration inevitably leads to a lowering in the degree of conversion of the bromine, complicates the control of the cooling of the HBr formed and increases the risks of explosion.

Patent application DE 2,738,744 describes a device for the combustion of bromine in hydrogen which comprises a combustion chamber, characterized by its tube shape and a transverse section which gradually largens from the orifice of the conduit of the said combustion chamber. This device has the drawback of being relatively inflexible at low speed, of being sensitive to flame return and of giving mediocre-quality HBr gas (2000 ppm by weight of bromine).

SUMMARY OF THE INVENTION

It has now been found that a device as described later can be used in a process for manufacturing hydrogen bromide by direct combustion of bromine in hydrogen according to the reaction $H_2+Br_2 \rightarrow 2HBr$, the said process consisting in carrying out the following steps successively:

intimately mixing hydrogen and an oxidant in a chamber, starting a flame at the outlet of the said chamber, replacing all or part of the oxidant by a stream of prevaporized bromine, in an $H_2/Br_2$ molar ratio which is suitable for maintaining a stable flame at the outlet of the said chamber and in a so-called combustion zone, thereby making it possible to obtain complete combustion of the bromine in the hydrogen, cooling the combustion gases in a cooling zone, then recovering a flow of hydrogen bromide gas under a pressure at least equal to 1 bar absolute and preferably under a pressure between 1.3 bar absolute and 10 bar absolute and at a temperature not above 125° C. and preferably between 40° C. and 125° C.

According to the present invention, any mixture consisting of a gas which is inert towards the reactants of the reaction for the formation of HBr and an amount of oxygen which is sufficient to lead to a combustible mixture with hydrogen may be used as oxidant. Nitrogen may be used as inert gas. The oxidant is preferably air.

According to the present invention, the oxidant may be partially or totally replaced. In the case where a certain amount of oxidant is maintained, this amount may vary within a wide range which depends in particular on the organic impurities present in the supply stream of bromine gas, the size characteristics of the apparatus and the use downstream of the HBr produced.

Hydrogen and the oxidant are introduced in gaseous form into the chamber. When the flame is started, the oxidant is replaced by bromine gas introduced at a temperature above its boiling point and preferably between 100° C. and 160° C.

The hydrogen will advantageously be preheated to a temperature not above 150° C. and preferably between 60° C. and 100° C.

The pressure in the chamber is at least equal to 1 bar absolute, preferably greater than 1.3 bar absolute and even more preferably between 1.8 bar absolute and 10 bar absolute.

It would not constitute a departure from the invention if the pressure was slightly below atmospheric pressure.

The $H_2/Br_2$ molar ratio is greater than 1. Preferably, the $H_2/Br_2$ molar ratio is greater than 1 and less than 1.5. The Applicant has observed that, under the reaction conditions of the present invention, the bromine is consumed instantaneously and almost completely.

The reaction of bromine and hydrogen is accompanied by a release of heat (12.3 kcalories per mole of HBr gas formed) which raises the temperature of the combustion flame to more than 1600° under adiabatic conditions.

According to the present invention, the cooling of the hydrogen bromide formed starts from the moment of its formation in the combustion zone as a function of the excess hydrogen and of the cooling of the combustion chamber, and then continues in a cooling zone designed such that the temperature falls gradually in these zones and is in the region of 600° C. at the outlet of the cooling zone and is preferably between 40° C. and 125° C. This outlet temperature can be adapted as a function of the constraints of the downstream devices. The pressure prevailing in the said cooling zone is preferably between 1.3 bar absolute and 10 bar absolute.

BRIEF DESCRIPTION OF THE DRAWINGS

FIGS. 3A and 3B are side views of the apparatus of FIG. 1 which includes a finishing stage.

DETAILED DESCRIPTION

Figure 1:
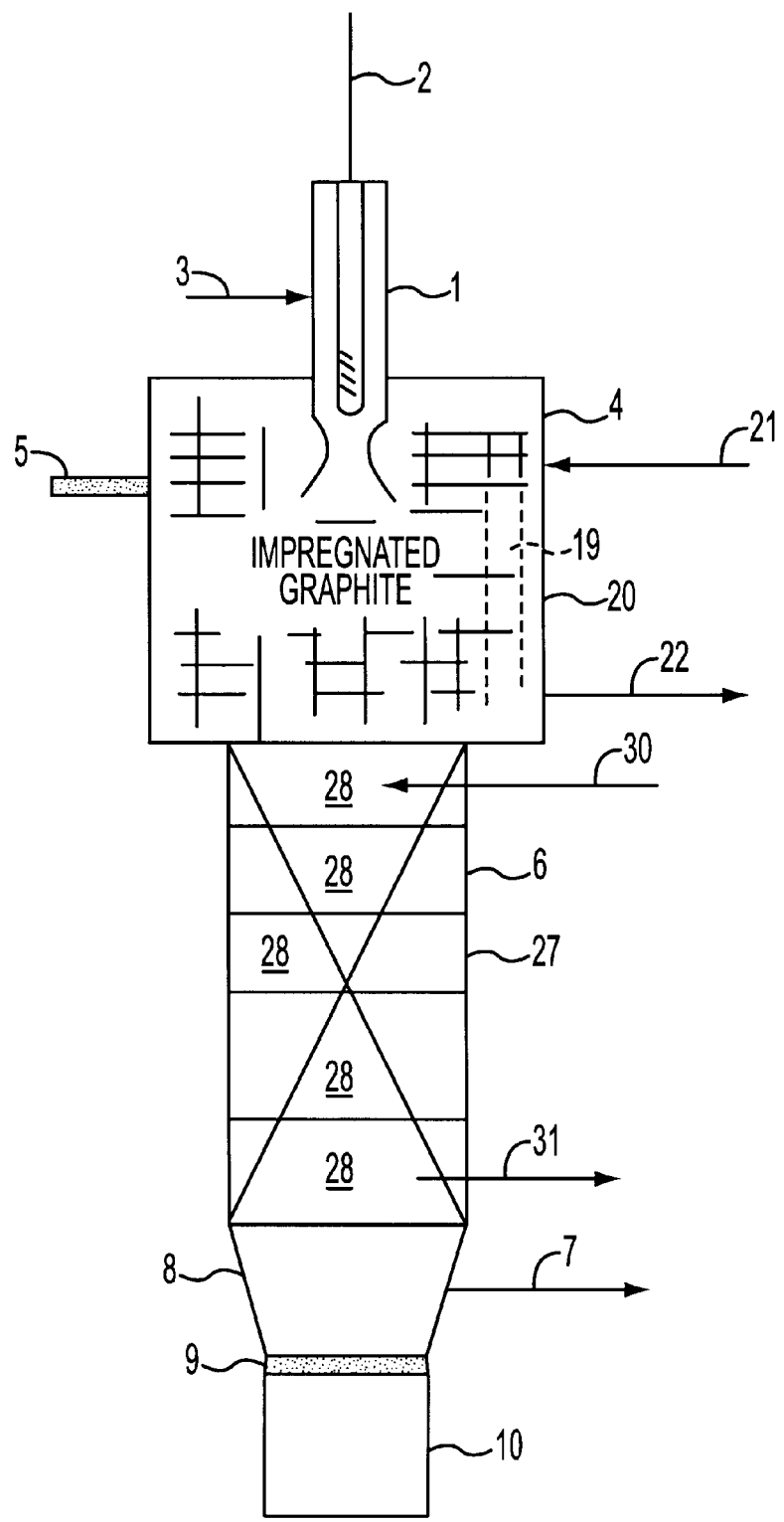
FIG. 1 is a side view of an apparatus which includes a burner and reaction chamber for manufacturing hydrogen bromide.

The device according to the present invention, as represented diagrammatically in FIG. 1, successively comprises:

a burner (1) comprising means (2) for introducing the bromine and/or the oxidant, means (3) for introducing the hydrogen and means for mixing the bromine and /or oxidant and hydrogen to place these reactants in contact, a reaction chamber (4), means (5) for starting a flame, means (6) for cooling the combustion gases (HBr), means (7 and 8) for evacuating the combustion gases (HBr), and safety members (9) and (10).

Figure 2:
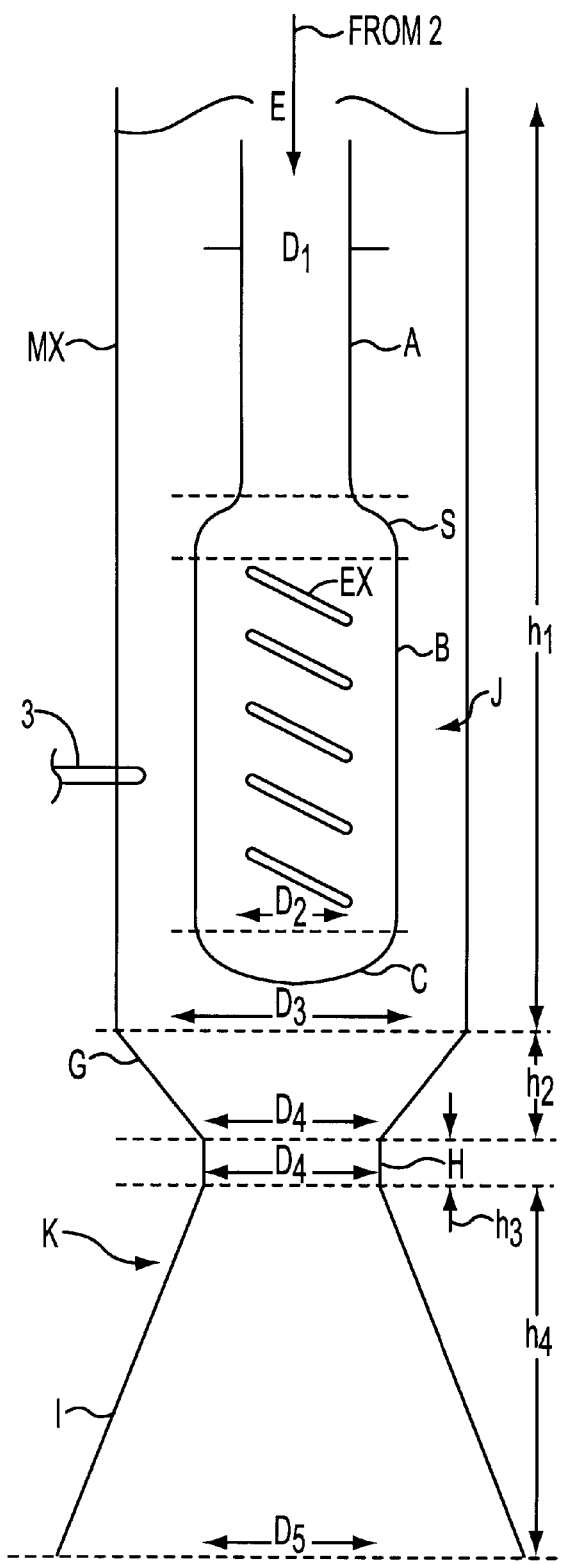
FIG. 2 is a side view of a burner in accordance with the present invention.

According to the present invention, the burner (1) consists of a vertical chamber (E) inside which is placed a vertical cylindrical tube, as represented in FIG. 2, including:

an open cylindrical upper part (A) of length L1 and diameter of D1, a cylindrical lower part (B) of length L2 and of diameter D2, with D2>D1, this lowe part (B) being terminated with a spherical cap (C). Part (B) is provided with orifices (F) that are preferably inclined.

Parts (A) and (B) are joined by a spherical segment (S).

Reaction chamber (E) consists of 4 successive zones:

a cylindrical zone (M) of height h1 and of diameter D3, a convergent frustoconical zone (G) of height h2 and of diameters D3 and D4 respectively, with D3>D4, a cylindrical zone (H) of height h3 and of diameter D4, a divergent frustoconical zone (I) of height h4 and of diameters D4 and D5 respectively, with D4<D5, h2<h4 and D5 advantageously being greater than D3.

The values of L1, L2, D1, D2, D3, D4, D5, h1, h2, h3, h4 and the number of orifices (F) determine the flexibility of the device. A person skilled in the art will adapt these values to the required capacity and to the exploitation constraints of the plant.

According to the present invention, the bromine and/or the oxidant are introduced via (2) directly into the vertical tube at the upper part of the cylindrical part (A) and the hydrogen is introduced via (3), preferably perpendicular to the vertical tube and inside the volume consisting of the chamber (E) and the said vertical tube.

The chamber and the vertical tube may consist of refractory materials with are inert towards reactants, such a silica or quartz, or of a metal having a resistance which is suited to the quality of the reactants, such as nickel.

According to the present invention, the base of the burner emerges in the reaction chamber (4), which is advantageously cooled.

This reaction chamber is fitted with means (5) for starting the flame. The flame may be started by a lighting member which provides the energy required for lighting up. This may be a small auxiliary burner, via an inspection port (not represented in FIG. 1).

As shown in FIG. 1, this reaction chamber may consist of graphite 19 impregnated with phenolic resins, fluoro polymers or carbon with an outer steel jacket 20 in which a heat-exchange fluid may circulate via lines 21 and 22.

According to the present invention, the impregnated graphite should have thermal, mechanical and chemical resistance characteristics that are suited to the process.

As is shown in FIG. 3, this reaction chamber can also comprise an inner sleeve 26 along all or part of the height of the said chamber. This sleeve can be made of quartz, of ceramic or of any other material which allows reflection of the radioactive emissions of the flame and which helps to confine the heat within the combustion chamber.

The cooling zone or cooling chamber (6) according to the present invention consists of a steel jacket in which are piled blocks of impregnated graphite (28).

According to the present invention, these blocks (20) consist of axial channels in which the combustion gases circulate, and radial channels in which water, a cold brine or a heat-exchange fluid from inlet (30) circulates and exits via outlet (31).

According to the present invention, the number of blocks to be used may vary within a wide range. It is calculated such that the temperature of the combustion gases arriving into the lower pot (8) is not more than 125° C. and is preferably between 40° C. and 60° C.

According to the present invention, the means (8) for evacuating the combustion gases (HBr) consist of a lower pot, in particular one made of sintered PVDF with an outer steel jacket.

This pot is equipped with a side outlet (7) for the gas produced and safety members such as rupture disc (9) which is connected to a screen (10).

According to the present invention, the combustion chamber is advantageously equipped with one or more inspection ports located closest to the flame.

These inspection ports may in particular allow visual or instrument control of the flame and the introduction of the lighting means.

This process in accordance with the invention may also be carried out using a specific device as represented diagrammatically in FIGS. 3A and 3B.

In this device, a finishing stage (11) which may be equipped with a by-pass circuit (12) (FIG. 3B) has been inserted within the cooling zone (6).

The finishing stage consists of a vitrified steel jacket in which there is a catalytic charge such as active charcoal.

According to this variant, the temperature of the gases entering this finishing stage may vary within a wide range. It is not more than 300° C. and preferably between 200° C. and 300° C.

This process in accordance with the invention is of great flexibility while at the same time ensuring good operational safety and good operability.

For a given size of the combustion chamber and of the cooling zone, the entry flow rates of the reactants may be varied within a wide range. This is allowed since the burner may be changed easily.

This process also has the advantage of leading to a very pure hydrogen bromide, having a weight content of bromine of not more than 100 ppm, at a sufficient pressure, thereby allowing it to be used either as a reactant in organic synthesis or to prepare pure HBr solutions without using expensive recompression and purification means.

In addition, this process makes it possible to obtain bromine-free vent gases.

The example which follows illustrates the invention.

A generator as represented in FIG. 1 is used, comprising:

a burner, as represented diagrammatically in FIG. 2, consisting of a vertical quartz mixing chamber (E) inside which is a verticla tube (A and B), a combustion chamber (4) of diameter equal to 250 mm consisting of carbon-impregnated graphite and of height equal to 1,200 mm.

This combustion chamber is cooled with water to an inlet temperature equal to 28° C., a cooling zone or cooling chamber (6) comprising a zone fitted with 5 blocks of graphite impregnated with Graphylor® type HB, sold by the company Carbone Lorrainem, and cooled by circulation of water, a pot (8) made of sintered PVDF, an evacuation line (7), a rupture disc (9) and a screen (10).

The generator is equipped with two inspection ports, arranged on the walls of the combustion chamber in the bottom part of the burner.

The size of the items of equipment mentioned above have been determined in order to produce an amount of pure hydrogen bromide ranging from 1.4 to 9.6 tons per day.

Under established conditions, the burner is fed with the following reactants:

hydrogen:

flow rate: 5 kg/h pressure: 3 bar absolute temperature: 80° C.

The flame is started using a device (5) consisting of an $H_2$/air pilot burner which projects a flame via one of the 2 inspection ports.

Once the flame is started, the stream of air is replaced by a stream of bromine gas:

flow rate: 395 kg/H pressure: 3 bar temperature: 140° C.

water content: <0.01% chlorine content: <0.05%.

The appearance of the flame may be observed via the inspection port. An adapted cell on one of the inspection ports makes it possible to reveal precisely the proportions of the combustion reactants (color of the flame) and thereby allows the flow rates to be adjusted.

The generator operates continuously, producing 400 kg/H of HBr gas including at least 399.9kg of pure HBr leaving at (7) at 40° C. and at a pressure of 1.8 bar absolute. The hydrogen bromide obtained is colorless and contains on average less than 100 mg of bromine per kg of HBr.

The chamber (4) referred to herein as a combustion chamber and a reaction chamber is a chamber in which the so-called combustion includes the $H_2/Br_2$ reaction which results in the production of heat in the absence of an oxidant.

The burner (1) operates as a mixing chamber in which the chamber (E) receives bromine from the line (2) via a tubular member (A), which bromine is dispensed via slits (F) into an annular space (J) where it mixes with $H_2$ from line (3). This mixture is then dispensed out of the chamber (E) by the converging/diverging nozzle (K) formed by components (G), (H) and (I) into the reaction chamber (4).

From the foregoing description, one skilled in the art can easily ascertain the essential characteristics of this invention, and without departing from the spirit and scope thereof, can make various changes and modification of the invention to adapt it to various usages and conditions.

What is claimed is:

1. A process for manufacturing hydrogen bromide by direct combustion of bromine in hydrogen, comprising carrying out the following steps successively:

mixing hydrogen and an oxidant in a chamber having an outlet configured as a converging/diverging nozzle with a cylindrical segment disposed between converging and diverging segments to form a mixture;

passing the mixture through converging/diverging nozzle at the outlet of the chamber;

starting a flame at the outlet of the chamber;

replacing all or part of the oxidant by a stream of prevaporized bromine, in an $H_2/Br_2$ molar ratio mixture which is suitable for maintaining a stable flame at the outlet of the said chamber in a combustion zone, as the $H_2/Br_2$ molar ratio is passed through the converging/diverging nozzle, thereby obtaining complete combustion of the bromine in the hydrogen to produce combustion gas at the outlet;

cooling the combustion gas resulting from combustion of the bromine in the hydrogen in a cooling zone; then recovering a flow of hydrogen bromine gas under a pressure at least equal to one bar absolute and at a temperature in a range between 40° C. and 125° C.

2. The process according to claim 1, wherein the oxidant is totally replaced by a stream of bromine.

3. The process according to claim 1, wherein the oxidant is partially replaced by a stream of bromine.

4. The process according to claim 1, wherein the oxidant is air.

5. The process according to claim 1, wherein the pressure in the chamber is at least equal to 1 bar absolute.

6. The process according to claim 1, wherein the $H_2/Br_2$ molar ratio is greater than 1 and less than 1.5.

7. The process according to claim 1, wherein the pressure prevailing in the cooling zone is at least equal to 1.3 bar absolute.

8. The process according to claim 1, wherein a stream of hydrogen bromide gas under a pressure of between 1.3 bar absolute and 10 bar absolute and at a temperature of between 40° C. and 60° C. is recovered.

9. The process according to claim 1 wherein the pressure in the chamber is greater than 1.3 bar absolute.

10. The process according to claim 1 wherein the pressure in the chamber is between 1.8 bar absolute and 10 bar absolute.

11. The process of claim 1 wherein the pressure prevailing in the cooling zone is between 1.3 bar absolute and 10 bar absolute.

* * * * *